(12) United States Patent
Sivan et al.

(10) Patent No.: US 11,671,180 B2
(45) Date of Patent: Jun. 6, 2023

(54) SYSTEM AND METHOD FOR COMMUNICATION BETWEEN QUANTUM CONTROLLER MODULES

(71) Applicant: Quantum Machines, Tel Aviv (IL)

(72) Inventors: Itamar Sivan, Tel Aviv (IL); Yonatan Cohen, Tel Aviv (IL); Nissim Ofek, Tel Aviv (IL); Ori Weber, Tel Aviv (IL); Guy Osi, Tel Aviv (IL)

(73) Assignee: Quantum Machines

( * ) Notice: Subject to any disclaimer, the term of this patent is extended or adjusted under 35 U.S.C. 154(b) by 99 days.

(21) Appl. No.: 17/242,547

(22) Filed: Apr. 28, 2021

(65) Prior Publication Data

US 2022/0368429 A1 Nov. 17, 2022

(51) Int. Cl.
*H04B 10/70* (2013.01)
*G06N 10/00* (2022.01)
*H04L 7/00* (2006.01)

(52) U.S. Cl.
CPC ............. *H04B 10/70* (2013.01); *G06N 10/00* (2019.01); *H04L 7/0087* (2013.01); *H04L 7/0091* (2013.01)

(58) Field of Classification Search
CPC ...... H04B 10/70; G06N 10/00; H04L 7/0087; H04L 7/0091
See application file for complete search history.

(56) References Cited

U.S. PATENT DOCUMENTS

| | | | |
|---|---|---|---|
| 4,875,484 A | 10/1989 | Anzai et al. | |
| 6,993,108 B1 | 1/2006 | Chi et al. | |
| 7,451,292 B2 | 11/2008 | Routt | |
| 7,627,126 B1 * | 12/2009 | Pikalo | H04L 9/0858 713/168 |
| 8,315,969 B2 | 11/2012 | Roetteler | |
| 8,385,878 B2 | 2/2013 | Rao | |
| 8,750,717 B1 | 6/2014 | Yap et al. | |
| 9,207,672 B2 | 12/2015 | Williams | |
| 9,400,499 B2 | 7/2016 | Williams | |
| 9,509,324 B2 | 11/2016 | McDonald et al. | |
| 9,692,423 B2 | 6/2017 | McDermott, III | |
| 9,847,121 B2 | 12/2017 | Frank | |
| 9,858,531 B1 | 1/2018 | Monroe | |
| 9,892,365 B2 | 2/2018 | Rigetti | |
| 9,978,020 B1 | 5/2018 | Gambetta | |

(Continued)

FOREIGN PATENT DOCUMENTS

| | | | |
|---|---|---|---|
| CN | 105281886 A | 1/2016 | |
| CN | 105912070 A | 8/2016 | |

(Continued)

OTHER PUBLICATIONS

U.S. Appl. No. 62/294,966, filed Feb. 12, 2016.

(Continued)

*Primary Examiner* — Steven H Nguyen

(74) *Attorney, Agent, or Firm* — McAndrews, Held & Malloy, Ltd.

(57) ABSTRACT

A channel between quantum controller modules (e.g., pulse processors) is operable to communicate high speed data required for processing qubit states that may be distributed across a quantum computer. The latency of the communication channel is deterministic and controllable according to a system clock domain.

31 Claims, 5 Drawing Sheets

(56) References Cited

U.S. PATENT DOCUMENTS

| | | | |
|---|---|---|---|
| 9,979,400 B1 | 5/2018 | Sete | |
| 9,996,801 B2 | 6/2018 | Shim | |
| 10,063,228 B2 | 8/2018 | Deurloo et al. | |
| 10,122,351 B1 | 11/2018 | Naaman | |
| 10,127,499 B1 | 11/2018 | Rigetti | |
| 10,192,168 B2 | 1/2019 | Rigetti | |
| 10,223,643 B1 | 3/2019 | Bishop et al. | |
| 10,333,503 B1 | 6/2019 | Cohen et al. | |
| 10,454,459 B1 | 10/2019 | Cohen | |
| 10,496,069 B2 | 12/2019 | Nazarathy et al. | |
| 10,505,524 B1 | 12/2019 | Cohen | |
| 10,560,076 B1 | 2/2020 | Cohen | |
| 10,637,449 B1 | 4/2020 | Cohen et al. | |
| 10,659,018 B1 | 5/2020 | Cohen | |
| 10,666,238 B1 | 5/2020 | Cohen | |
| 10,958,253 B1 | 3/2021 | Cohen et al. | |
| 10,985,739 B2 | 4/2021 | Cohen et al. | |
| 11,010,145 B1 | 5/2021 | Smith et al. | |
| 2004/0266084 A1 | 12/2004 | Fujishima et al. | |
| 2005/0135627 A1* | 6/2005 | Zavriyev | H04L 9/0852 380/278 |
| 2005/0180575 A1 | 8/2005 | Maeda et al. | |
| 2006/0093376 A1* | 5/2006 | Mitchell | H04B 10/70 398/183 |
| 2006/0204010 A1* | 9/2006 | Mitchell, Jr. | H04L 9/12 380/278 |
| 2016/0125311 A1 | 5/2016 | Fuechsle et al. | |
| 2016/0267032 A1 | 9/2016 | Rigetti et al. | |
| 2016/0292586 A1 | 10/2016 | Rigetti et al. | |
| 2017/0214410 A1 | 7/2017 | Hincks et al. | |
| 2017/0317814 A1* | 11/2017 | Grice | H04B 10/70 |
| 2017/0364796 A1 | 12/2017 | Wiebe | |
| 2018/0013426 A1 | 1/2018 | Deurloo et al. | |
| 2018/0032893 A1 | 2/2018 | Epstein | |
| 2018/0091244 A1 | 3/2018 | Abdo | |
| 2018/0123597 A1 | 5/2018 | Sete | |
| 2018/0260245 A1 | 9/2018 | Smith | |
| 2018/0260730 A1 | 9/2018 | Reagor | |
| 2018/0260732 A1 | 9/2018 | Bloom | |
| 2018/0308007 A1 | 10/2018 | Amin | |
| 2018/0322409 A1 | 11/2018 | Barends | |
| 2018/0365585 A1 | 12/2018 | Smith | |
| 2018/0373995 A1 | 12/2018 | Tomaru et al. | |
| 2018/0375650 A1* | 12/2018 | Legre | G06F 1/12 |
| 2019/0042964 A1 | 2/2019 | Elsherbini et al. | |
| 2019/0042965 A1 | 2/2019 | Clarke | |
| 2019/0042970 A1 | 2/2019 | Zou | |
| 2019/0042971 A1 | 2/2019 | Zou | |
| 2019/0042972 A1 | 2/2019 | Zou | |
| 2019/0042973 A1 | 2/2019 | Zou | |
| 2019/0049495 A1 | 2/2019 | Ofek | |
| 2019/0251478 A1 | 8/2019 | Bishop et al. | |
| 2019/0385088 A1 | 12/2019 | Naaman et al. | |
| 2020/0364602 A1 | 11/2020 | Niu et al. | |
| 2021/0004707 A1 | 1/2021 | Gambetta et al. | |
| 2021/0103847 A1 | 4/2021 | Akzam | |

FOREIGN PATENT DOCUMENTS

| | | |
|---|---|---|
| CN | 108111306 A | 6/2018 |
| CN | 110085094 A | 8/2019 |
| CN | 111464154 | 7/2020 |
| CN | 111767055 A | 10/2020 |
| CN | 112019193 | 12/2020 |
| CN | 112149832 A | 12/2020 |
| JP | 2011175078 | 9/2011 |
| WO | 2015178991 A2 | 11/2015 |
| WO | 2015178992 A2 | 11/2015 |
| WO | 2017078735 A1 | 5/2017 |
| WO | 2017139683 A1 | 8/2017 |
| WO | 2018062991 A1 | 4/2018 |
| WO | 2019063117 A1 | 4/2019 |
| WO | 2020033807 A1 | 2/2020 |
| WO | 2020231795 A1 | 11/2020 |

OTHER PUBLICATIONS

Int'l Search Report and Written Opinion Appln No. PCT/IB2019/001410 dated Jun. 10, 2020.

Int'l Search Report and Written Opinion Appln No. PCT/IB2019/001394 dated Jun. 17, 2020.

Zhang J, Hegde SS, Suter D. Pulse sequences for controlled 2-and 3-qubit gates in a hybrid quantum register. arXiv preprint arXiv:1806.08408. Jun. 21, 2018.

Wang CY, Kuznetsova L, Gkortsas VM, Diehl L, Kaertner FX, Belkin MA, Belyanin A, Li X, Ham D, Schneider H, Grant P. Mode-locked pulses from mid-infrared quantum cascade lasers Optics Express. Jul. 20, 2009;17(15):12929-43.

Int'l Search Report and Written Opinion Appln No. PCT/IB2020/000218 dated Aug. 11, 2020.

Quan R, Zhai Y, Wang M, Hou F, Wang S, Xiang X, Liu T, Zhang S, Dong R. Demonstration of quantum synchronization based on second-order quantum coherence of entangled photons. Scientific reports. Jul. 25, 2016;6:30453. Jul. 25, 2016 (Jul. 25, 2016).

Int'l Search Report and Written Opinion Appln No. PCT/IB2020/000376 dated Sep. 17, 2020.

Breitfelder et al. eds., IEEE 100: The Authoritative Dictionary of IEEE Standards Terms 1247, definition 2 of "variable" (7th ed. 2000). (Year: 2000).

Int'l Search Report and Written Opinion Appln No. PCT/IB2020/000707 dated Jan. 12, 2021.

National Academies of Sciences, Engineering, and Medicine. "Quantum Computing: Progress and Prospects". eprint (Dec. 2018) [online]. [retrieved on Jan. 7, 2020]. retrieved from: <https://doi.org/10.17226/25196.> Dec. 4, 2018 (Dec. 4, 2018) pp. 114, 142, 210, Fig. 2.5, Qiskit Backend Specifications at footnote 57: section 4.2, 5.1.5, Fig. 3, Fig. 4 , pp. 30, 57.

IBM Research. "Qiskit Backend Specifications for OpenQASM and OpenPulse Experiments", eprint arXiv:1809.03452v1 (Sep. 10, 2018) [online]. [retrieved on Jan. 7, 2020]. retrieved from: <https://arxiv.org/pdf/1809.03452.pdf> Sep. 10, 2018 (Sep. 10, 2018) section 4.2, 5.1.5, Fig. 3, Fig. 4 , pp. 30, 57.

Int'l Search Report and Written Opinion Appln No. PCT/IB2020/000704 dated Jan. 17, 2021.

Wolfowicz, et al. Pulse Techniques for Quantum Information Processing University of Chicago, University College London, eMagRes, 2016, vol. 5: 1515-1528. DOI 10.1002/9780470034590.emrstm1521.

Int'l Search Report and Written Opinion Appln No. PCT/IB2020/000555 dated Dec. 27, 2020.

Int'l Search Report and Written Opinion Appln No. PCT/IB2020/000760 dated Jan. 27, 2021.

"Quantum-classical interface based on single flux quantum digital logic". In: Quantum Science and Technology 3.2 (2018), pp. 1-16. DOI: 10.1088/2058-9565/aaa3a0.(retrieved on Jan. 20, 2021). Retrieved from the Internet: < https://arxiv.org/pdf/1710.04645.pdf > McDermott R. et al. Oct. 12, 2017 (Oct. 12, 2017) Section VI, VII, VIII.

Int'l Search Report and Written Opinion Appln No. PCT/IB2020/001004 dated May 13, 2021.

Int'l Preliminary Report on Patentability Appln No. PCT/IB2019/001410 dated Jun. 10, 2021.

Int'l Search Report and Written Opinion Appln No. PCT/IB2021/000067 dated Jun. 21, 2021.

Int'l Preliminary Report on Patentability Appln No. PCT/IB2019/001394 dated Jul. 29, 2021.

Roffe, J., Quantum Error Correction: An Introductory Guide, Dept. of Physics & Astronomy, Univ. of Sheffeld, UK, Oct. 10, 2019, pp. 1-29.

Int'l Search Report and Written Opinion Appln No. PCT/IB2022/000059 dated Jul. 7, 2022.

Moreira , "QuTech Central Controller: A Quantum Control Architecture for a Surface-17 Logical Qubit." Delft University of Technology Student Theses Collection (2019). Available at the following URL: http://resolver.tudelft.nl/uuid:502ed5e5-87f7-42bd-a077-c24b7281cd94 May 10, 2019 (May 10, 2019).

Int'l Preliminary Report on Patentability Appln No. PCT/IB2020/001004 dated Jun. 30, 2022.

(56) References Cited

OTHER PUBLICATIONS

Int'l Search Report and Written Opinion Appln No. PCT/IB2022/000024 dated Jul. 18, 2022.
Baier, Simon, Matteo Pompili, Sophie LN Hermans, Hans KC Beukers, Peter C. Humphreys, Raymond N. Schouten, Raymond FL Vermeulen et al. "Realization of a Multi-Node Quantum Network of Remote Solid-State Qubits", Science, vol. 372, pp. 259-264 (2021) Baier Simon Apr. 16, 2021 (Apr. 16, 2021).
Int'l Search Report and Written Opinion Appln No. PCT/IB2022/000068 dated Jul. 17, 2022.
D. Copsey et al., "Toward a scalable, silicon-based quantum computing architecture," in IEEE Journal of Selected Topics in Quantum Electronics, vol. 9, No. 6, pp. 1552-1569, Nov.-Dec. 2003, doi: 10.1109/JSTQE.2003.820922. Dec. 31, 2003 (Dec. 31, 2003).
Int'l Preliminary Report on Patentability Appln No. PCT/IB2020/000218 dated Sep. 16, 2021.
Int'l Preliminary Report on Patentability Appln No. PCT/IB2020/000376 dated Nov. 12, 2021.
Int'l Search Report and Written Opinion Appln No. PCT/IB2021/056254 dated Dec. 1, 2021.
Ribeiro, Diogo C., Pedro M. Cruz, and Nuno Borges Carvalho, "Towards a denser frequency grid in phase measurements using mixer-based receivers." 2015 85th Microwave Measurement Conference (ARFTG). IEEE, 2015. Dec. 31, 2015 (Dec. 31, 2015).
Int'l Preliminary Report on Patentability Appln No. PCT/IB2020/000555 dated Feb. 10, 2022.
Int'l Preliminary Report on Patentability Appln No. PCT/IB2020/000707 dated Mar. 17, 2022.
Int'l Preliminary Report on Patentability Appln No. PCT/IB2020/000704 dated Mar. 17, 2022.
Int'l Preliminary Report on Patentability Appln No. PCT/IB2020/000760 dated Apr. 7, 2022.
Int'l Search Report and Written Opinion Appln No. PCT/IB2022/050190 dated Apr. 11, 2022.

\* cited by examiner

SYSTEM AND METHOD FOR COMMUNICATION BETWEEN QUANTUM CONTROLLER MODULES

BACKGROUND

Limitations and disadvantages of conventional approaches to communication between quantum controller modules will become apparent to one of skill in the art, through comparison of such approaches with some aspects of the present method and system set forth in the remainder of this disclosure with reference to the drawings.

BRIEF SUMMARY

Systems and methods are provided for communication between quantum controller modules, substantially as illustrated by and/or described in connection with at least one of the figures, as set forth more completely in the claims.

DETAILED DESCRIPTION

Figure 1:
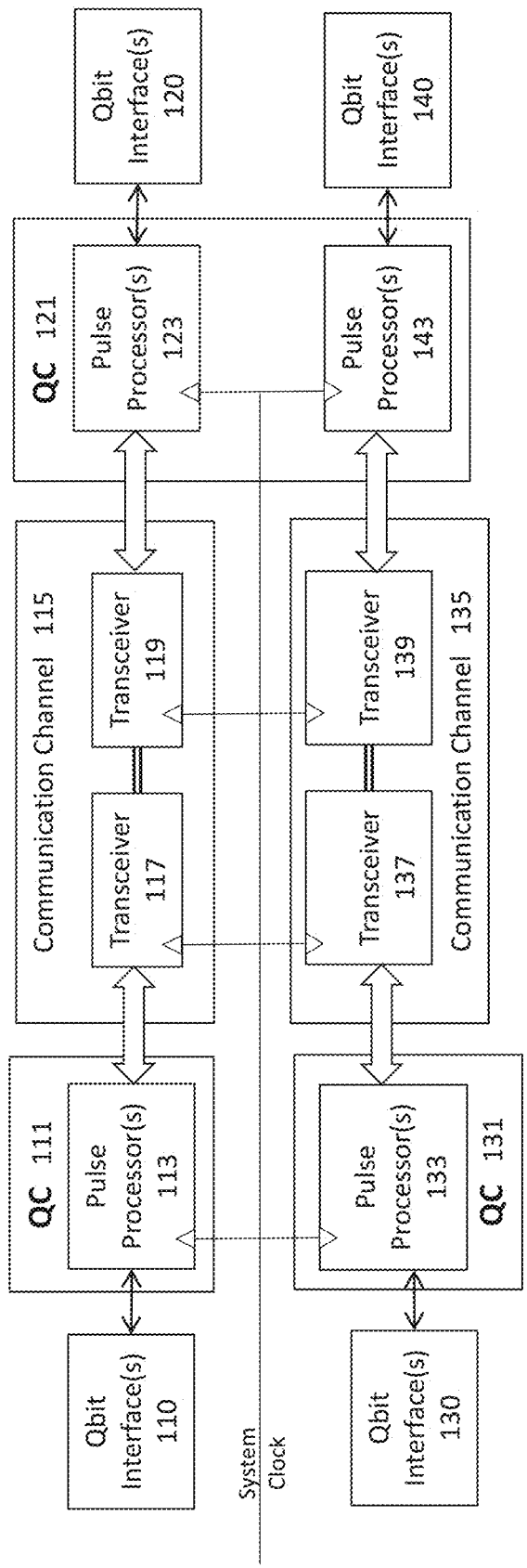
FIG. 1 illustrates an example system that supports communication between quantum controller modules in accordance with various example implementations of this disclosure.

Classical computers operate by storing information in the form of binary digits ("bits") and processing those bits via binary logic gates. At any given time, each bit takes on only one of two discrete values: 0 (or "off") and 1 (or "on"). The logical operations performed by the binary logic gates are defined by Boolean algebra and circuit behavior is governed by classical physics. In a modern classical system, the circuits for storing the bits and realizing the logical operations are usually made from electrical wires that can carry two different voltages, representing the 0 and 1 of the bit, and transistor-based logic gates that perform the Boolean logic operations.

Logical operations in classical computers are performed on fixed states. For example, at time 0 a bit is in a first state, at time 1 a logic operation is applied to the bit, and at time 2 the bit is in a second state as determined by the state at time 0 and the logic operation. The state of a bit is typically stored as a voltage (e.g., 1 $V_{dc}$ for a "1" or 0 $V_{dc}$ for a "0"). The logic operation typically comprises of one or more transistors.

Obviously, a classical computer with a single bit and single logic gate is of limited use, which is why modern classical computers with even modest computation power contain billions of bits and transistors. That is to say, classical computers that can solve increasingly complex problems inevitably require increasingly large numbers of bits and transistors and/or increasingly long amounts of time for carrying out the algorithms. There are, however, some problems which would require an infeasibly large number of transistors and/or infeasibly long amount of time to arrive at a solution. Such problems are referred to as intractable.

Quantum computers operate by storing information in the form of quantum bits ("qubits") and processing those qubits via quantum gates. Unlike a bit which can only be in one state (either 0 or 1) at any given time, a qubit can be in a superposition of the two states at the same time. More precisely, a quantum bit is a system whose state lives in a two dimensional Hilbert space and is therefore described as a linear combination $\alpha|0\rangle + \beta|1\rangle$, where $|0\rangle$ and $|1\rangle$ are two basis states, and $\alpha$ and $\beta$ are complex numbers, usually called probability amplitudes, which satisfy $|\alpha|^2+|\beta|^2=1$. Using this notation, when the qubit is measured, it will be 0 with probability $|\alpha|^2$ and will be 1 with probability $|\beta|^2$. The basis states $|0\rangle$ and $|1\rangle$ can also be represented by two-dimensional basis vectors $$\begin{bmatrix}1\\0\end{bmatrix} \text{ and } \begin{bmatrix}0\\1\end{bmatrix},$$

respectively. The qubit state may represented by $$\begin{bmatrix}\alpha\\\beta\end{bmatrix}.$$

The operations performed by the quantum gates are defined by linear algebra over Hilbert space and circuit behavior is governed by quantum physics. This extra richness in the mathematical behavior of qubits and the operations on them, enables quantum computers to solve some problems much faster than classical computers. In fact, some problems that are intractable for classical computers may become trivial for quantum computers.

Unlike a classical bit, a qubit cannot be stored as a single voltage value on a wire. Instead, a qubit is physically realized using a two-level quantum mechanical system. For example, at time 0 a qubit is described as $$\begin{bmatrix}\alpha_1\\\beta_1\end{bmatrix},$$

at time 1 a logic operation is applied to the qubit, and at time 2 the qubit is described as $$\begin{bmatrix}\alpha_2\\\beta_2\end{bmatrix}.$$

Many physical implementations of qubits have been proposed and developed over the years. Some examples of qubits implementations include superconducting circuits, spin qubits, and trapped ions.

A quantum controller (QC) generates the precise series of external signals, usually pulses of electromagnetic waves and pulses of base band voltage, to perform the desired logic operations (and thus carry out the desired quantum algorithm).

A quantum programming subsystem is operable to generate a quantum algorithm description which configures the QC and includes instructions the QC can execute to carry out the quantum algorithm (i.e., generate the necessary outbound quantum control pulse(s)) with little or no human intervention during runtime. In an example implementation, the quantum programming system is a personal computer comprising a processor, memory, and other associated circuitry (e.g., an x86 or x64 chipset). The quantum programming subsystem then compiles the high-level quantum algorithm description to a machine code version of the quantum algorithm description (i.e., series of binary vectors that represent instructions that the QC's hardware can interpret and execute directly).

The quantum programming subsystem may be coupled to the QC via an interconnect which may, for example, utilize a universal serial bus (USB), a peripheral component interconnect (PCIe) bus, wired or wireless Ethernet, or any other suitable communication protocol.

The QC comprises circuitry operable to load the machine code quantum algorithm description from the programming subsystem via the interconnect. Then, execution of the machine code by the QC causes the QC to generate the necessary outbound quantum control pulse(s) that correspond to the desired operations to be performed on the quantum processor (e.g., sent to qubit(s) for manipulating a state of the qubit(s) or to readout resonator(s) for reading the state of the qubit(s), etc.). Depending on the quantum algorithm to be performed, outbound pulse(s) for carrying out the algorithm may be predetermined at design time and/or may need to be determined during runtime. The runtime determination of the pulses may comprise performance of classical calculations and processing in the QC during runtime of the algorithm (e.g., runtime analysis of inbound pulses received from the quantum processor).

During runtime and/or upon completion of a quantum algorithm performed by the QC, the QC may output data/results to the quantum programming subsystem. In an example implementation these results may be used to generate a new quantum algorithm description for a subsequent run of the quantum algorithm and/or update the quantum algorithm description during runtime.

A QC may comprise a plurality of pulse processors, which may be implemented in a field programmable gate array, an application specific integrated circuit or the like. A pulse processor is operable to control outbound pulses that drive a quantum element (e.g., one or more qubits and/or resonators). A pulse processor is also operable to receive inbound pulses from a quantum element.

Each pulse processor may share data, metadata and computational values with one or more other pulse processors and make joint decision regarding the control flow and the quantum data sent to the quantum elements. Pulse processors may, therefore, be operable synchronously. Because a QC only has a limited set of pulse processors, one QC may only be operable control a quantum device with a limited number of quantum elements.

In some scenarios however, the quantum algorithm may require multiple pulse processors across a plurality of QC's to perform joint processing. A large number of parallel operations may be required across these multiple QC's.

A QC involves analog converters and a large amount of logic, which may not be integrated into a single device. Therefore, a distributed design approach may be used together with communication channels to support it. To allow data distribution with seamless functionality, a communication channel needs to support chip-to chip, board-to-board and device-to-device interfaces that may include optical transceivers and fiber as the physical channel. Therefore, a need exists for communication protocol that supports a high bandwidth communication channel with low latency. The physical layer of such a protocol may comprise a AC-coupled serial input and/or output with a bandwidth of 16 GHz or higher, an end-to-end deterministic latency of 40 ns or less and a single reference clock synchronized to both ends in the interface. Additional support logic supporting higher layers of the protocol may be implemented in an FPGA.

FIG. 1 illustrates an example quantum computer system that supports communication between quantum controller modules in accordance with various example implementations of this disclosure. FIG. 1 illustrates a number of pathways for communication among pulse processors 113, 123, 133 and 143 across communication channels 115 and 135. Pulse processors 113, 123, 133 and 143 and communication channels 115 and 135 remained synchronized by a system clock, which may operate at 250 MHz, for example.

A first QC 111 may comprise a first set of one or more pulse processors 113. A second QC 121 may comprise a second set of one or more pulse processors 123. Communication channel 115 couples the first set of one or more pulse processors 113 to the second set of one or more pulse processors 123. The communication channel 115 comprises a first transceiver 117, a second transceiver 119 and a transmission medium such as optical fiber. A serial data stream may be communicated over the optical fiber at 16 Gb/s.

The first transceiver 117 is operable to convert a plurality of data, from the first set of one or more pulse processors 113, into an analog signal representing a serial data stream. The plurality of data may be associated with a first qubit that is coupled to qubit interface(s) 110. The second transceiver 119 is operable to receive the analog signal representing the serial data stream and convert this signal into a plurality of received data from the first set of one or more pulse processors 113. The second set of one or more pulse processors 123 is operable to control a second qubit, that is coupled to qubit interface(s) 120, according to the plurality of received data.

Data can flow from the first set of one or more pulse processors 113 to the second set of one or more pulse processors 123 as described above. Transceivers 117 and 119 may be bidirectional, such that data can also flow from the second set of one or more pulse processors 123 to the first set of one or more pulse processors 113 in a similar fashion.

A quantum computer may comprise a plurality of communication channels 115 and 135. An additional channel 135 may enable communication with additional pulse processors 133 and 143 that may control additional qubit interfaces 130 and 140. These additional pulse processors 133 may be located a new QC 131 that is operably coupled to a single channel 135. These additional pulse processors 143 may also be located a QC 121 that is operably coupled to two channels 115 and 135.

The first set of one or more pulse processors 113 is operable to generate the plurality of data according to a quantum state estimate of a first group of one or more qubits. Alternatively, the plurality of data may be based on a signal sent by the first set of one or more pulse processors 113 to control the first group of one or more qubits via the qubit interface 110. The plurality of data may also comprise a plurality of instructions and/or metadata. A synchronization of the pulse processors 113 and 123 may be according to these instructions and/or metadata. For example, pulse processor 113 is operable to generate the plurality of data of a sync operation with the pulse processor 123 to allow sending signals to control qubits or to compute state estimation of the qubits in a synchronized manner.

A qubit state may be measured by, for example: probing a resonator that is coupled to the qubit, counting photons emitted by the qubit, or using a single electron transistor near a quantum dot qubit. A single photon detector or a camera may be used to translate photons to an electric signal measured by the controller.

The second set of one or more second pulse processors 123 is operable to generate a signal for the control of a second group of one or more qubits according to the plurality of received data. The second set of one or more pulse processor 123 may also generate a result according to the plurality of received data and a quantum state estimate of the second group of one or more qubits.

Figure 2:
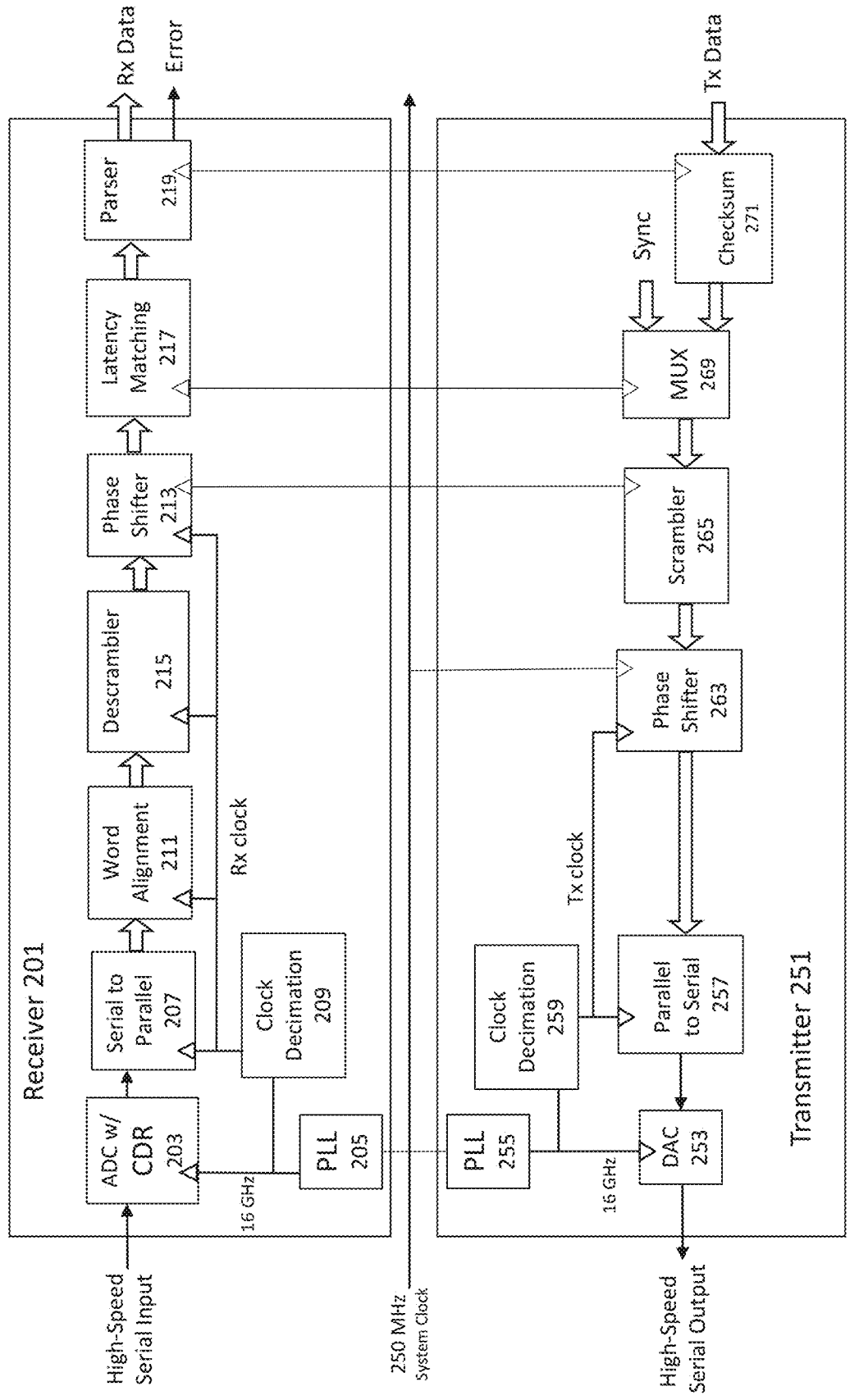
FIG. 2 illustrates an example transceiver that supports communication between quantum controller modules in accordance with various example implementations of this disclosure.

FIG. 2 illustrates an example transceiver 200 (e.g., transceivers 117, 119, 127 and 129 in FIG. 1) that supports communication between quantum controller modules (e.g., pulse processors 113, 123, 133 and 143 in FIG. 1) in accordance with various example implementations of this disclosure. As illustrated, transceiver 200 comprises a receiver 201 and a transmitter 252.

The receiver 201 comprise an analog to digital converter (ADC) 203, a first phase locked loop (PLL) 205, a serial to parallel converter 207, a first clock decimation circuit 209, a word alignment circuit 211, a first phase shifter 213, a descrambler 215, a latency matching circuit 217 and a parser 219.

The transmitter 251 comprises a digital to analog converter (DAC) 253, a second PLL 255, a parallel to serial converter 257, a second clock decimation circuit 259, a second phase shifter 263, a scrambler 265, a multiplexor 269 and circuitry for adding an error check sequence.

The first PLL 205 generates a sampling frequency for the ADC 203 based on the system clock. For example, the first PLL 205 may generate a 16 GHz sampling frequency based on a 250 MHz system clock. The clocking of the serial to parallel converter 207 is based on the generated sample frequency. For example, the first clock decimation circuit 209 may generate a 250 MHz receive clock that is derived from the 16 GHz sampling frequency. As a result, 64 different phases are possible between the 250 MHz system clock and the 250 MHz receive clock. The phase may also vary for every reset and power up. The first phase shifter 213 overcomes the phase difference by crossing from the receive clock domain to the system clock domain while minimizing latency.

The second PLL 255 generates a DAC frequency for the DAC 253 based on the system clock. For example, the second PLL 255 may generate a 16 GHz sampling frequency based on a 250 MHz system clock. The clocking of the parallel to serial converter 257 is based on the generated DAC frequency. For example, the second clock decimation circuit 259 may generate a 250 MHz transmit clock that is derived from the 16 GHz DAC frequency. As a result, 64 different phases are possible between the 250 MHz system clock and the 250 MHz transmit clock. As with the receive clock, the phase may also vary for every reset and power up. The second phase shifter 263 overcomes the phase difference by crossing from the system clock domain to the transmit clock domain while minimizing latency.

Figure 3:
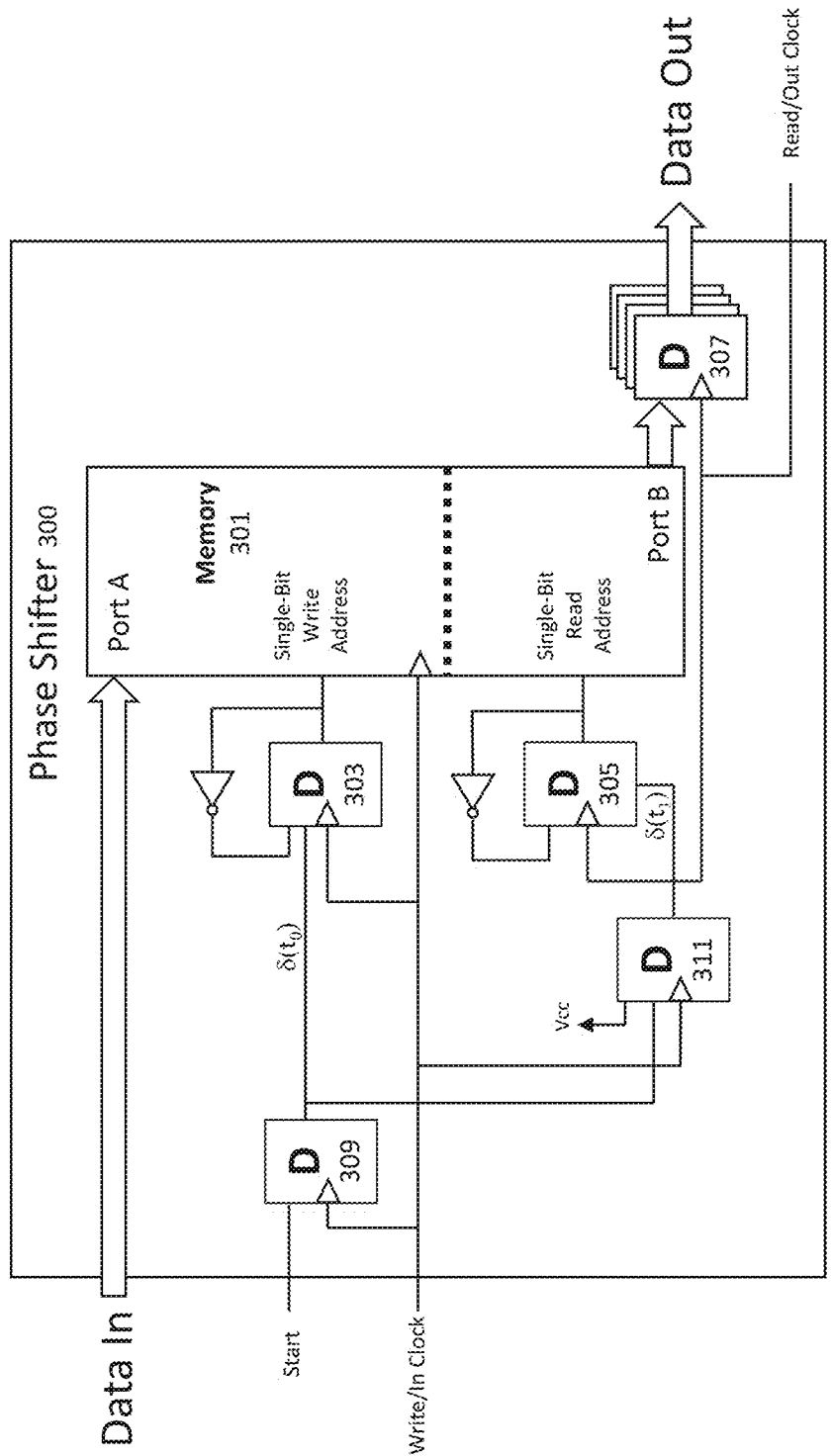
FIG. 3 illustrates an example phase shifter for use in a transceiver that supports communication between a plurality of quantum controller modules in accordance with various example implementations of this disclosure.

FIG. 3 illustrates an example phase shifter 300 (e.g., phase shifters 213 and 263 in FIG. 2) that supports communication between a plurality of quantum controller modules (e.g., pulse processors 113, 123, 133 and 143 in FIG. 1) in accordance with various example implementations of this disclosure.

The phase shifter 300 comprises a dual port distributed RAM 301 with a depth of 2, and with a write address entry and a read address entry. A flip-flop 303, clocked by the input data clock, is used to generate the write address of a single bit. A flip-flop 305, clocked by the output data clock, is used to generate the read address of a single bit. This memory 301 has a one cycle write on port A and an asynchronous read to a multi-bit flip-flop 307, equal to the memory bus width, on port B. Read and writes operations may be done simultaneously.

The memory write address is initiated by the rising edge of a start signal at $t_0$. The start signal is synchronized to the write clock. In parallel, the memory read address is initiated by the falling edge of the start signal at $t_1$. Therefore, a ½ clock period gap exist between a write and any following reads initiated by the read clock. The read cycle will be begin on the rising edge of the read clock, thereby insuring a latency of up to 1 clock cycle system wide. The total latency added by the phase shifter 300 is between zero and one clock cycle according to the phase difference between the write clock and the read clock. In the case of a multi-channel receiver, all channels must be aligned to the maximum latency to ensure the latency is deterministic and minimized.

The phase shifter 300 (e.g., phase shifters 213 and 263 in FIG. 2) is enabled by the initialization of the Clock Domain Crossing (CDC). Once the read and write clocks are running, a Start signal is sampled (by flop-flop 309) on the rising edge of the write clock to initiate the write to the memory. In parallel, the Start signal is sampled (by flop-flop 311) on the following negative edge of the write clock, thereby insuring ½ clock period gap between a write and any following read initiated by the read clock.

The read cycle will be done on the immediate rising edge of the read clock, thereby insuring a latency of up to 1 clock cycle system-wise. Turning back now to FIG. 2. If both the RX phase shifter 213 and the TX phase shifter 263 have read clocks in the right phase to catch the written data, no latency is added by the CDC. If either the RX phase shifter 213 or the TX phase shifter 263 have a delay relative to the system clock, 1 clock cycle of system latency is added. If both the RX phase shifter 213 and the TX phase shifter 263 have a delay relative to the system clock, 2 clock cycles of system latency is added.

The phase shifter 213 is operable to receive parallel data according to the clock domain of receiver clock and transfer the parallel data according to the clock domain of the system clock. The phase shifter 263 is operable to receive parallel data according to the clock domain of system clock and transfer the parallel data according to the clock domain of the transmit clock.

The scrambler 265 and descrambler 215 enables AC coupling of the high-speed analog signal, and maintain CDR functionality over time. The scrambler 129 and the descrambler 113 may apply a multiplicative scrambler polynomial, such as, for example, $1+Z^{-38}+Z^{-57}$.

To enable a high bandwidth using a single stream, the ADC 203 of the receiver 201 performs clock and data recovery (CDR) from the serial stream. The serial input received by the ADC 203 includes a known preamble that enable the CDR to lock. This preamble word is unscrambled.

An example 128 bit preamble is the sequence:
0x55555555555555550505050505050505.

By using a known preamble, the word aliment circuit 211 is able to select the beginning of a data word of, for example, 64 bits. The word alignment circuit 211 may comprise 1 multiplexer per bit of the data word.

The receiver 201 is initialized by, first, locking the PLL 205. The receiver then monitors for the preamble. The receiver latency is determined according to the variability due to clock domain crossing between the interface clocks and the system clock. The transmission medium may introduce additional time of flight latency. The maximal latency value in cycles is matched by the latency matching circuit 217.

The serial output from the transmitter 251 may include a progressing timestamp counter that is shared across multiple channels for synchronization of a plurality of QC's. The maximal difference between the received timestamp and a locally generated timestamp across every communication channel contributes to the determination of the maximal latency in the system. This difference may indicate that a maximal latency is set too low and the calibration process should restart. Each receive channels, in a multi-channel system, may be delayed a different number of cycles. The entire system may be calibrated to have a fixed delay of maximal latency cycles.

Transmission errors may be identified by add a CRC and/or a checksum. For example, the checksum circuit 271 may generate a 8 bit checksum over the lower 56 bits of a 64 bit word. At the receiver, the parser 219 may regenerate the 8 bit checksum over the lower 56 bits of a 64 bit word received. If the regenerated checksum does not match the received checksum, an error is flagged.

Figure 4:
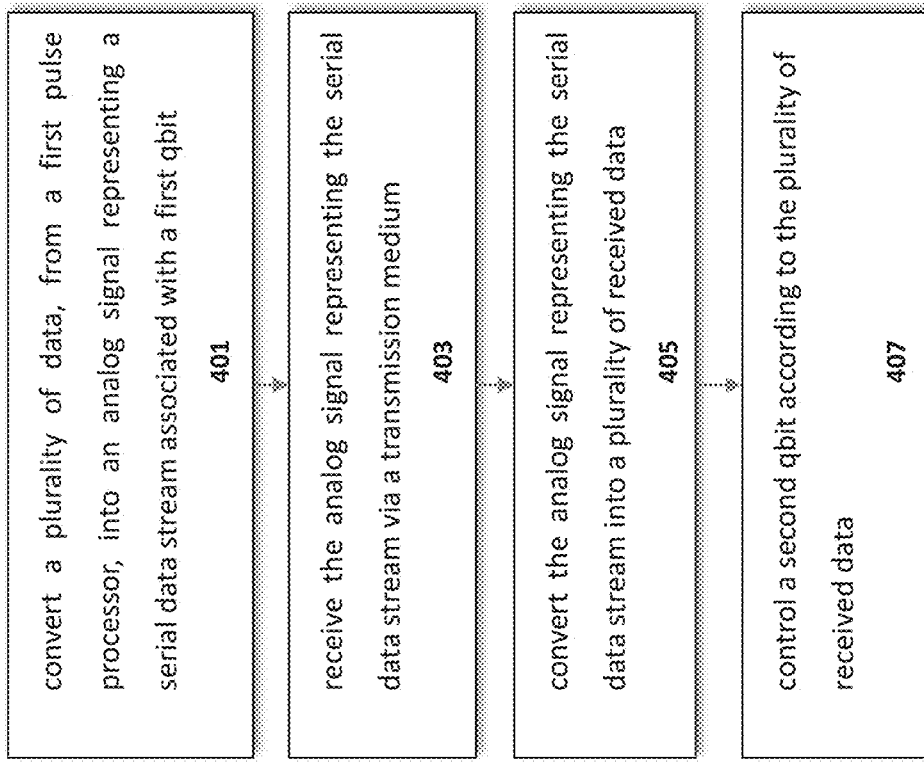
FIG. 4 illustrates an example method for communication between quantum controller modules in accordance with various example implementations of this disclosure.

FIG. 4 illustrates an example method for communication between quantum controller modules in accordance with various example implementations of this disclosure.

At 401, a plurality of data, from a first pulse processor, is converted into an analog signal representing a serial data stream associated with a first qubit. The plurality of data may comprise a quantum state estimate of the first qubit and/or data according to the quantum state estimate of the first qubit. The plurality of data may also comprise information related to an signal used to control a qubit. The analog signal representing the serial data stream may be transmitted according to an independent clock domain.

At 403, the analog signal representing the serial data stream is received via a transmission medium, such as an optical fiber. The plurality of data may be communicated over the transmission medium at 16 Gb/s.

At 405, the analog signal representing the serial data stream is converted into a plurality of received data. The plurality of data may be sampled according to a first clock domain. The sampled data may then be transferred to a QC according to a second clock domain such as a system clock. This clock domain transfer enables a transmitter and a receiver to be synchronized via the system clock.

At 407, a second qubit is controlled according to the plurality of received data. The second qubit may be controlled by generating a signal for the second qubit according to the plurality of received data. For example, a pulse processor may be operable to generate an electromagnetic signal for transmission to the second qubit or a device that controls the second qubit such as an acousto-optic modulator (AOM) that modulates a laser beam.

Further results may be generated according to the plurality of received data and a quantum state estimate of the second qubit.

While this disclosure describes an exemplary system with direct communication between two QCs, the disclosed systems and methods are also applicable to communication between more than two QCs, for example via a switch.

This disclosure is able to achieve minimal and deterministic latency using high speed transceivers (e.g., gigabit transceivers, "GTs") connecting two or more devices. As described above, the total latency added by the phase shifter 300 is between zero and one clock cycle according to the phase difference between the write clock and the read clock. This means that the latency of sending data from one device to another is the base transceiver latency. The cable latency and a non-deterministic latency may be between 0-2 clock cycles, which results from the clock uncertainty for the clock domain crossing between the read and write clock and the system clock, at each side (transmit and receive).

Figure 5:
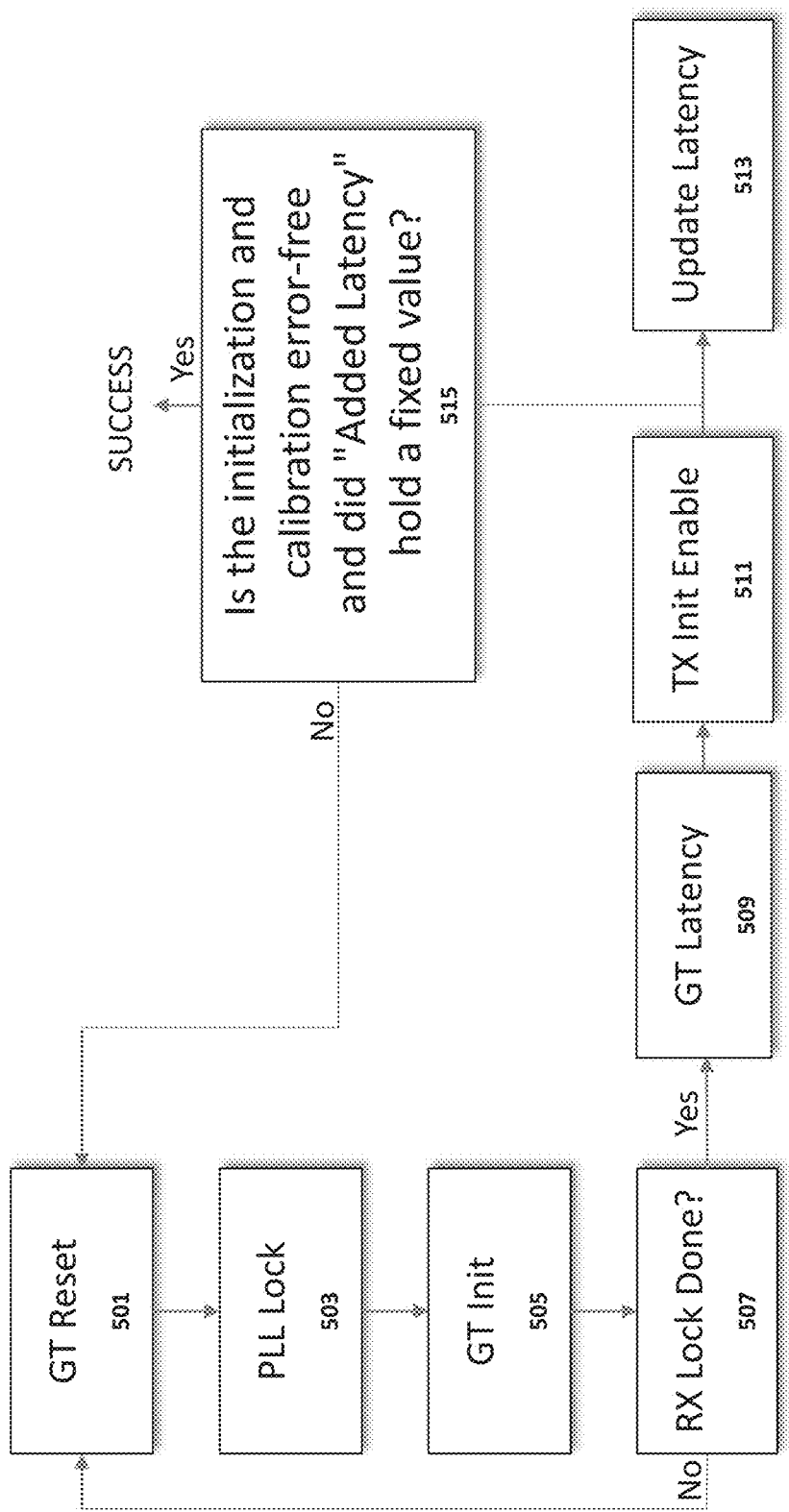
FIG. 5 illustrates an example method for initialization and calibration of a transceiver line in accordance with various example implementations of this disclosure.

In order to achieve deterministic communication, which is a key factor for quantum algorithms, the following initialization and calibration method is disclosed. FIG. 5 illustrates an example method for initialization and calibration of a transceiver line in accordance with various example implementations of this disclosure.

At first, the two transceivers (TX and RX) are reset via a software register write (i.e., "GT Reset") at 501. Following the reset, the PLL of the transceiver will lock at 503. The TX clock on the transmitting side and the RX clock on the receiving side are generated by the reference clock, and each have an unknown phase. For instance, for a transceiver at 16 GHz and internal read/write clock of 250 MHz (equal to the system clock frequency), the RX and TX clock can each have any of 64 possible phases. Alternatively, the system clock at both devices may be phase aligned to the same 250 MHz as they are generated by the same clocking source.

At 505, software will initiate a register write called "GT Init," thereby causing the TX side to send the known and unscrambled preamble and the "word alignment" (211 in FIG. 2) of the receiver will be able to lock at the beginning of a data word.

When the receiver is able to locate the beginning of the stream, it will update a register called "RX Lock Done" at 507. Software may poll on that register looking for a lock. If a lock cannot be achieved, software will jump back to the beginning and will restart the process at 501.

When software detects that "RX Lock Done" is asserted, software will configure a "GT Latency" register at 509. The "GT Latency" register specifies the maximal latency for the communication (GT IP intrinsic latency+medium latency+2 cycles of uncertainty).

Software will then write a register called "TX nit Enable" at 511 causing both devices to transmit the progressing timestamp shared between both devices. Both devices will receive, in their RX channel, the received timestamp from the other device and subtract this value from the original timestamp they are managing. This value is termed as "Delta Timestamp." Note that the received timestamp is delayed by the latency of sending data from the other device. Subtracting "Delta Timestamp" from the "GT Latency" register value will result in value termed "Added Latency" that will have possible values 0,1,2, and specifying the added delay required at the receiver side, to align the latency to the "GT Latency" configured.

Via a software write of "Update Latency" at 513, this "Added Latency" will be stored and from this point forward will be used to ensure a fixed latency which is identical to the "GT Latency" value configured beforehand. At this point, "Update Latency" will be de-asserted and then "TX Init Enable" will also be de-asserted. At this point, the initialization is complete and the functional protocol can be executed on both devices with minimal and deterministic latency allowed between two end points.

During the time that "Update Latency" is asserted, the stability of the "Added Latency" may be monitored and stored in "GT Initialization Status." Software ensures "Update Latency" is asserted for sufficient period of time to check for errors. If there is an error in the initialization and calibration and "Added Latency" did not hold a fixed value for that time at 515, "GT Initialization Status" will assert and software will initiate the calibration process again by repeating the process at 501.

In practice, there are many GT channels for each FPGA device. For instance, 17 FPGA devices can be connected together if each FPGA has 16 GT lines. At each FPGA, each line will be used for direct communication to all other 16 FPGAs.

The flow described above to initiate and calibrate a single GT line can now be used to align all GT communication lines in parallel. Only lines that had errors in their initialization process will repeat this process and the global initialization and calibration process will complete where all GTs are fully calibrated. In case there are many devices connected, a variation of the medium is allowed (for instance one cable with the length of 2 meters and another with the length of 8 meters, alternatively the type of communication can also vary). As long as the maximal latency of the medium is known, all possible GTs can be calibrated to the maximal "GT Latency" whereas the maximal variation of the "Added Latency" may now be larger than the value of 2.

Also, an indirect GT topology may be used. Instead of direct communication, an indirect communication can be used for much larger scale up. As described above, 16 GT lines of 1 FPGA can connect to 16 FPGAs. As an example configuration, the 16 FPGAs may be functional controllers and the 1 FPGA may act as a quantum controller routing switch. With this example configuration, it is possible to cascade multiple building blocks of 16 controllers and a switch. For instance, 256 controllers can communicate through 16 switches when the stream of data has an 8-bit address for the communication destination. More degrees of switches are of course supported in this flow.

To minimize latency in a Xilinx transmitter, extra functionality (e.g., input buffer, FIFO, scrambling and/or encoding) may be eliminated. To minimize latency in a Xilinx receiver, extra functionality (e.g., output buffer, FIFO, clock correction, descrambling, channel bonding, word alignment and/or decoding) may be eliminated. However, removing functionality may result in higher error probability both in the initialization and calibration phase and in the functional phase.

The initialization and calibration flow is tolerant of errors due to its repetitive nature and the fact that the initialization and calibration process average time is typically negligible compared to the software compiling and loading time.

Errors in the functional phase may also be monitored and/or corrected by incorporating error detection and correction schemes (e.g., parity, checksum and/or error correction algorithms) as part of the stream data bus. Identifying errors may be sufficient for quantum algorithms, as long as the error probability is sufficiently low. Due to the probabilistic nature of the qubits, many repetitions of the same flow may be required to collect sufficient statistics. For example, if the same flow requires 10,000 iterations, it is acceptable to run it 10,001 times and neglect a single run that ended with errors.

The I/O interface receives high speed serial input and unfolds it to a parallel bus. There are few cycles of uncertainty caused by the clock-domain-crossing from the slow to fast clock in the transmitting side and from the fast to slow clock in the receiving side. The upper bound of the latency accounts for the transmitter/receiver circuitry and the propagation delay through the connectors and medium. Each QC has a timestamp counter that is synchronized with the timestamp counters of every other QC via an external clock source. A sync trigger is used to align both the internal clock phase of the controller and reset the timestamp counter. During calibration, two connected QCs send each other their aligned timestamp. Each QC receives the timestamp and compares it to its own timestamp. The QCs' own timestamp will be X cycles higher, as the received timestamp from another QC is delayed by the latency of sending the data. That X is subtracted from the known max latency, Y. The receiver side delays the transaction by Y cycles. Thus, the latency of all connections in the system is known. Therefore, the upper bound maximum communication latency is deterministic. In a given system with multiple communication paths (over potential different medium), the system may be synchronized according to a maximal latency. Given a deterministic latency, several QCs may operate together seamlessly with an expandable number of pulse processors. The communication channels may also comprise a QC switch and/or a shared resource, such as for joint computations.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or"

means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A quantum controller comprising:
   a pulse processor, wherein the pulse processor is operable to generate a first plurality of data in parallel according to one or more responses from a first group of one or more qubits; and
   a first transceiver, wherein the first transceiver is operable to:
      convert the first plurality of data into a first analog serial data stream,
      transmit the first analog serial data stream, over a first communication channel, to a second transceiver,
      receive from a third transceiver, via a second communication channel, a second analog serial data stream, and
      convert the second analog serial data stream into a second plurality of data wherein the pulse processor is operable to receive the second plurality of data in parallel to control a second group of one or more qubits.

2. The quantum controller of claim 1, wherein the second transceiver and the third transceiver are in a common device.

3. The quantum controller of claim 1, wherein the second transceiver and the third transceiver are in different devices, and wherein the quantum controller and the different devices are operably coupled to a switch.

4. The quantum controller of claim 1, wherein a full duplex channel comprises the first communication channel and the second communication channel.

5. The quantum controller of claim 1, wherein the pulse processor is operable to generate the first plurality of data according to a sync operation with another device.

6. The quantum controller of claim 1, wherein the first pulse processor is operable to generate the first plurality of data according to a quantum state estimate of from the first group of one or more qubits.

7. The quantum controller of claim 1, wherein the pulse processor is operable to generate an electromagnetic signal for transmission to a qubit in the second group of one or more qubits.

8. The quantum controller of claim 1, wherein the pulse processor is operable to generate an electromagnetic signal for transmission to a device that controls a qubit in the second group of one or more qubits, and wherein the device is operable to modulate a laser beam.

9. The quantum controller of claim 1, wherein the pulse processor is operable to generate the first plurality of data according to a resonator, and wherein the resonator is operable to generate an electromagnetic signal according a state of a qubit in the first group of one or more qubits.

10. The quantum controller of claim 1, wherein the first transceiver comprises a phase shifter operable to receive the first plurality of data from the pulse processor according to a first clock domain and transmit the first analog serial data stream according to a second clock domain.

11. The quantum controller of claim 1, wherein the first transceiver comprises a phase shifter operable to receive the second analog serial data stream according to a first clock domain and transfer the second plurality of data to the pulse processor according to a second clock domain.

12. The quantum controller of claim 1, wherein the first analog serial data stream and the second analog serial data stream are communicated at 16 Gb/s.

13. The quantum controller of claim 1, wherein the first transceiver and the second transceiver are synchronized to a system clock.

14. The quantum controller of claim 1, wherein upon initialization of the first transceiver and the second transceiver, a fixed latency is determined.

15. The quantum controller of claim 14, wherein the fixed latency is periodically monitored to identify errors, and wherein the first transceiver and the second transceiver are calibrated if the fixed latency is maintained during a monitoring period.

16. The quantum controller of claim 1, wherein upon initialization, the first transceiver and the second transceiver are operable communicate according to one or more fixed latencies.

17. The quantum controller of claim 1, wherein upon initialization, the first transceiver and the second transceiver are operable to communicate according to a configured dynamic latency.

18. The quantum controller of claim 1, wherein a latency between the first transceiver and the second transceiver is dynamically modifiable.

19. The quantum controller of claim 1, wherein upon initialization, a plurality of transceivers are operable to communicate according to a fixed latency via a dedicated quantum control switch.

20. The quantum controller of claim 1, wherein a latency between the first transceiver and the second transceiver is operably aligned via a shared timestamp.

21. The quantum controller of claim 1, wherein the first transceiver and the second transceiver are stripped to a bare functionality to minimize a latency, and wherein the latency is periodically and dynamically tracked for errors.

22. The quantum controller of claim 1, wherein the first transceiver comprises a phase shifter that is configured to write on a positive edge and read on a negative edge, and wherein a maximum clock domain crossing (CDC) transition is 1 clock cycle.

23. A method for communicating within a quantum controller comprising:
  converting a plurality of data, from a first pulse processor, into an analog signal representing a serial data stream, wherein the plurality of data is associated with a first group of one or more qubits;
  receiving the analog signal representing the serial data stream via a transmission medium;
  converting the analog signal representing the serial data stream into a plurality of received data;
  controlling a second group of one or more qubits according to the plurality of received data;
  determining a fixed latency through a first transceiver and a second transceiver;
  monitoring for a variation of the fixed latency during a period of time; and
  repeating the determining and monitoring, if the fixed latency varies during the period of time.

24. The method of claim 23, wherein the method comprises generating the plurality of data according to a quantum state estimate of the first group of one or more qubits.

25. The method of claim 23, wherein the method comprises generating a signal that is controls the modulation of a laser beam.

26. The method of claim 23, wherein the method comprises generating a result according to the plurality of received data and a quantum state estimate of the second group of one or more qubits.

27. The method of claim 23, wherein the method comprises:
  receiving the plurality of data according to a first clock domain; and
  transferring the plurality of data according to a second clock domain.

28. The method of claim 27, wherein the analog signal representing the serial data stream is transmitted according to a third clock domain.

29. The method of claim 23, wherein the method comprises communicating the analog signal representing the serial data stream over an optical fiber.

30. The method of claim 23, wherein the method comprises communicating the serial data stream over the transmission medium at 16 Gb/s.

31. The method of claim 23, wherein the method comprises synchronizing the first transceiver and the second transceiver to a system clock.

* * * * *